United States Patent
Roberts et al.

(10) Patent No.: US 9,367,174 B2
(45) Date of Patent: Jun. 14, 2016

(54) WIRELESS PERIPHERAL DATA TRANSMISSION FOR TOUCHSCREEN DISPLAYS

(71) Applicants: Richard D. Roberts, Hillsboro, OR (US); Tom E. Pearson, Beaverton, OR (US)

(72) Inventors: Richard D. Roberts, Hillsboro, OR (US); Tom E. Pearson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 14/229,556

(22) Filed: Mar. 28, 2014

(65) Prior Publication Data

US 2015/0277613 A1    Oct. 1, 2015

(51) Int. Cl.
*G06F 3/042* (2006.01)

(52) U.S. Cl.
CPC .............. *G06F 3/042* (2013.01); *G06F 3/0421* (2013.01); *G06F 3/0428* (2013.01); *G06F 2203/04109* (2013.01)

(58) Field of Classification Search
CPC ..... G06F 3/042; G06F 3/0421; G06F 3/0423; G06F 3/0425; G06F 3/0426; G06F 3/0428; G06F 3/041; G06F 3/0412; G06F 3/0416; G06F 3/03545; G06F 2203/04109; H04W 56/00; H04W 88/06; H04N 1/21; H04B 10/516; H04B 10/556; H04B 10/00; G09G 5/10; G09G 5/00
See application file for complete search history.

(56) References Cited

U.S. PATENT DOCUMENTS 5,164,714 A * 11/1992 Wehrer ................. G06F 3/0421
250/221

6,867,801 B1 * 3/2005 Akasawa ............. H04N 1/0035
345/633

(Continued)

FOREIGN PATENT DOCUMENTS

WO    WO 2007108592 A1 *  9/2007 .............. H03M 5/12
WO    WO 2010/053305 A2    5/2010
WO    WO 2012/093830 A2    7/2012

OTHER PUBLICATIONS

Frederic Su, "History and technology of wavelength division multiplexing", Oct. 30, 1997, Optoelectronics & Communications, Reports No. 166, p. 1.*

(Continued)

*Primary Examiner* — Dwayne Bost
*Assistant Examiner* — Darlene M Ritchie
(74) *Attorney, Agent, or Firm* — Blakely, Sokoloff, Taylor & Zafman LLP

(57) ABSTRACT

Embodiments of the disclosure describe data transmission via a touchscreen display of a mobile computing device. The mobile computing device includes a peripheral component, integrated into a touchscreen display surface housing, and a plurality of photonic pulse transmitters and receivers disposed on edges of the touchscreen display surface. One or more receivers receive pulses from the photonic pulse transmitters for detecting user touch inputs on the touchscreen display surface. A photonic pulse modulator modulates a pulse to be transmitted from one of the photonic pulse transmitters based, at least in part, on peripheral component data. A photonic pulse demodulator demodulates the modulated pulse received by the pulse detector(s) to retrieve the peripheral component data. By utilizing these pulse transmitters/receivers, used for user touch input detection, to also exchange data via modulated light, the bezel area around the touchscreen display surface may be reduced.

20 Claims, 9 Drawing Sheets

(56) References Cited

U.S. PATENT DOCUMENTS

| | | | | |
|---|---|---|---|---|
| 8,872,778 B2* | 10/2014 | Smith | | G06F 3/042 |
| | | | | 345/173 |
| 9,001,086 B1* | 4/2015 | Saini | | G06F 3/0428 |
| | | | | 345/175 |
| 9,013,450 B1* | 4/2015 | Afzal | | G06F 3/0421 |
| | | | | 345/104 |
| 2002/0030871 A1 | 3/2002 | Anderson et al. | | |
| 2003/0020993 A1* | 1/2003 | Ternullo | | G06F 11/10 |
| | | | | 398/126 |
| 2003/0128917 A1* | 7/2003 | Turpin | | H04N 1/0035 |
| | | | | 385/24 |
| 2004/0263443 A1* | 12/2004 | Shirasaki | | G09G 3/325 |
| | | | | 345/76 |
| 2011/0007032 A1* | 1/2011 | Goertz | | G06F 3/042 |
| | | | | 345/174 |
| 2011/0216042 A1* | 9/2011 | Wassvik | | G06F 3/0412 |
| | | | | 345/175 |
| 2012/0094594 A1 | 4/2012 | Rofougaran et al. | | |
| 2012/0106977 A1* | 5/2012 | Ma | | H04B 10/116 |
| | | | | 398/172 |
| 2012/0207138 A1* | 8/2012 | Korn | | H02M 7/53871 |
| | | | | 370/336 |
| 2014/0078112 A1 | 3/2014 | Sheng et al. | | |
| 2014/0098025 A1* | 4/2014 | Lin | | G06F 1/1632 |
| | | | | 345/169 |
| 2014/0176495 A1* | 6/2014 | Vlasov | | G06F 3/044 |
| | | | | 345/174 |
| 2014/0267060 A1* | 9/2014 | Li | | G06F 3/0416 |
| | | | | 345/173 |
| 2014/0320542 A1* | 10/2014 | Naruse | | G06F 3/1454 |
| | | | | 345/690 |
| 2015/0109220 A1* | 4/2015 | Yliaho | | G06F 3/0488 |
| | | | | 345/173 |
| 2015/0179133 A1* | 6/2015 | Lee | | G06F 3/044 |
| | | | | 345/174 |

OTHER PUBLICATIONS

PCT Notification of Transmittal of the International Search Report and the Written Opinion for PCT Counterpart Application No. PCT/US2015/016169, 13 pgs., (Apr. 29, 2015).

* cited by examiner

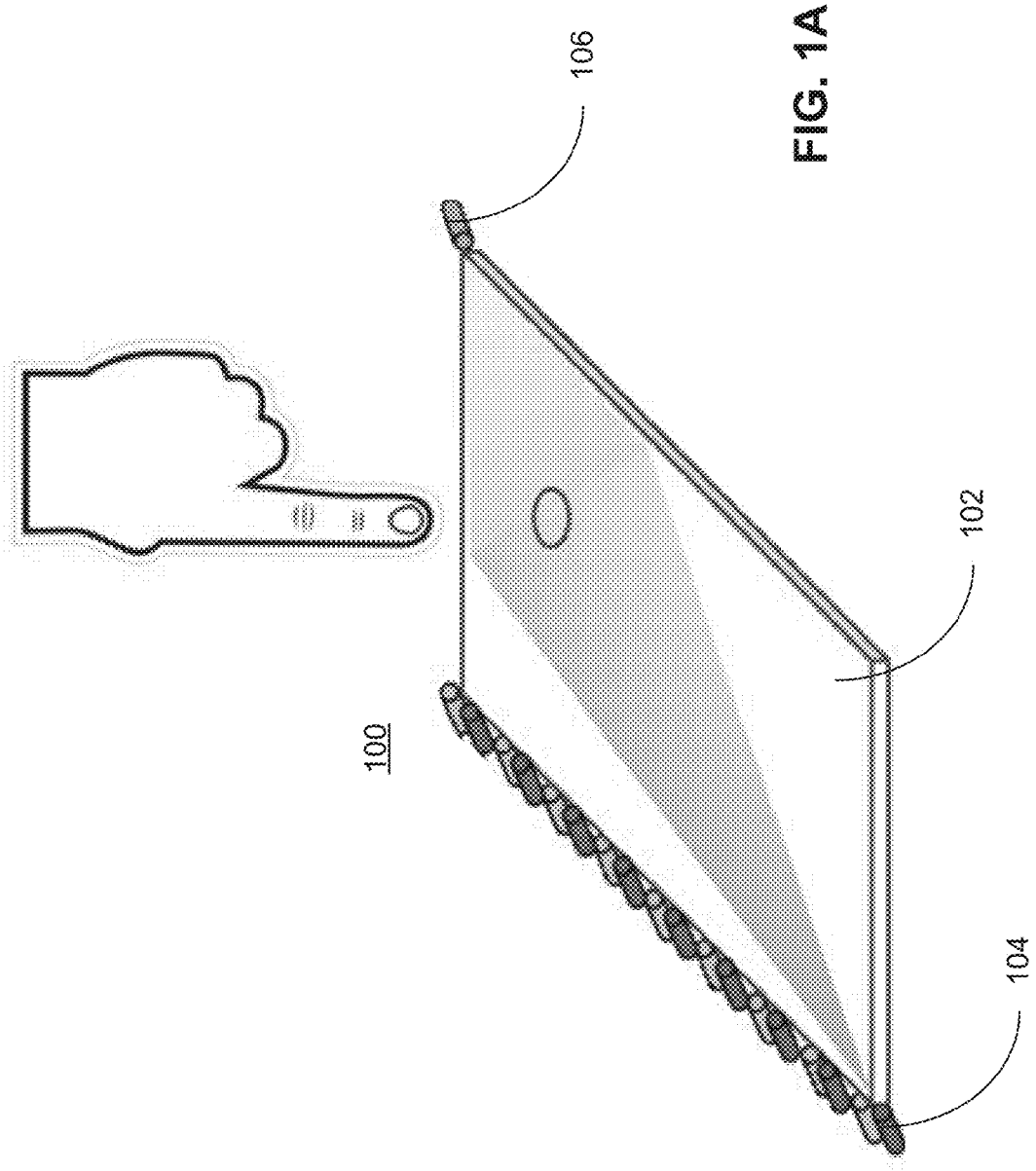

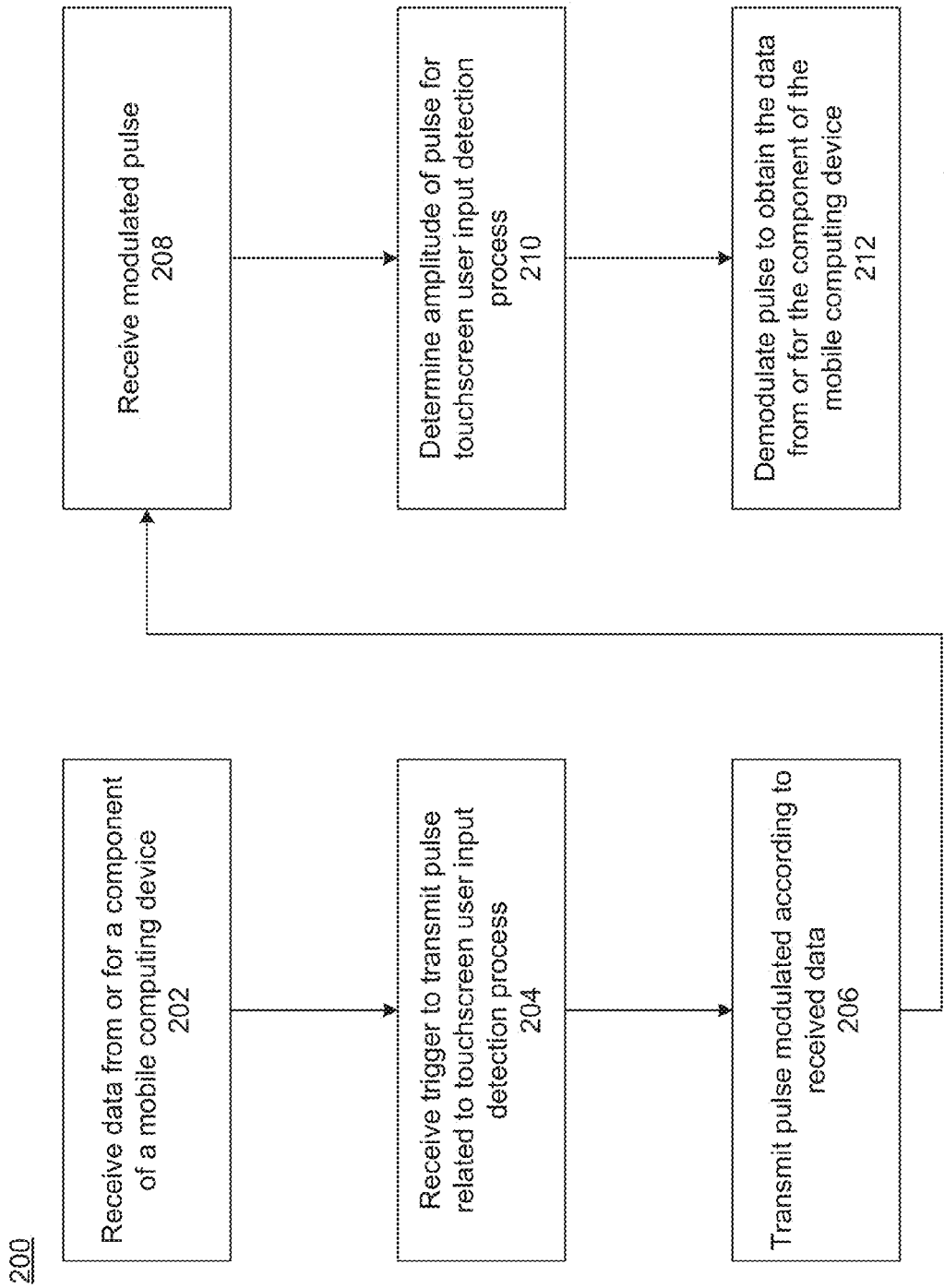

WIRELESS PERIPHERAL DATA TRANSMISSION FOR TOUCHSCREEN DISPLAYS

FIELD

Embodiments of the present invention generally pertain to computing devices and more specifically to mobile computing devices.

BACKGROUND

Mobile computing devices such as laptops, tablets, and smartphones utilize touchscreen displays, wherein the display surface also acts as a user input device. These touchscreen displays may be on a device in addition to, or as a substitute for, other user input devices such as keyboards. A user ideally wants the display surface of a mobile computing device to be maximized, and the form factor of the device to be minimized; this can be challenging when designing a device utilizing a touchscreen, as some touch sensing solutions require circuitry to be included in a thick bezel surrounding the touchscreen.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 1A and FIG. 1B are illustrations of data transmission components for a touchscreen display system according to an embodiment of the disclosure.

FIG. 2 is a flow diagram of a process for transmitting data via a touchscreen display of a computing device according to an embodiment of the disclosure.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe apparatuses, systems and methods for data transmission via touchscreen displays of mobile computing devices. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1B:
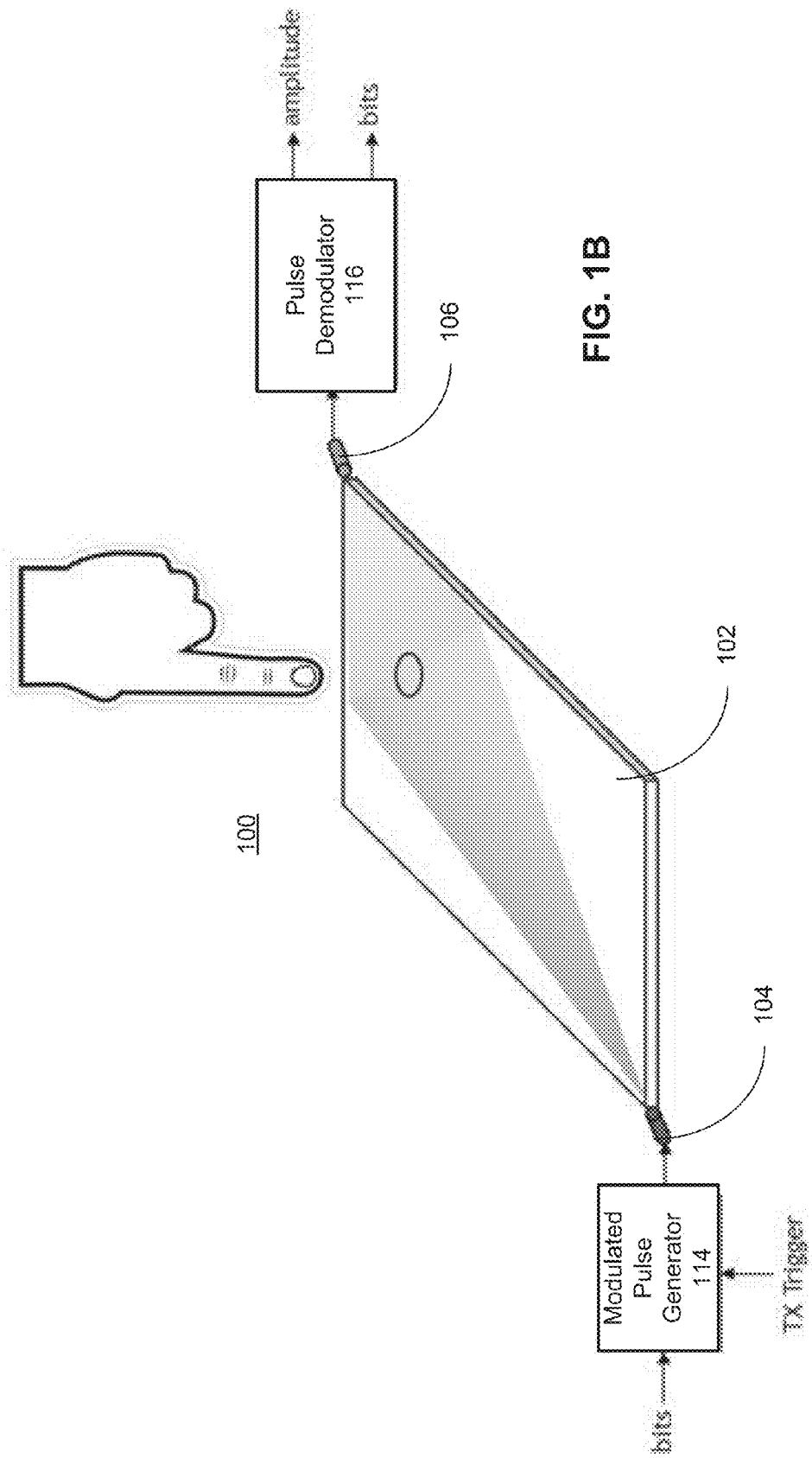

FIG. 1A and FIG. 1B are illustrations of data transmission components for a touchscreen display system according to an embodiment of the disclosure. In this embodiment, system 100 may be included in a desktop or mobile computing device, and is shown to include display screen layer 102, a plurality of pulse transmitters (including pulse transmitter 104), and a plurality of pulse receivers (including pulse receiver 106).

Touchscreens are increasingly becoming part of the user interface for computing devices. Touchscreens are used in desktop computing device and mobile computing devices such as laptops, tablets, smartphones, and wearable devices. Some solutions utilized by these devices to detect a user touch input on a display screen/surface include resistive touch detection, surface acoustic wave touch detection, capacitance touch detection, infrared grid touch detection, and infrared waveguide touch detection.

System 100 as illustrated comprises an infrared waveguide touch detection solution, in which infrared light is launched, via the plurality of pulse transmitters, into light conducting screen layer 102 (e.g., comprising glass or polymer). While infrared waveguide solutions may utilize several different types of solutions, including camera based and projector based light guide, system 100 utilizes frustrated total internal reflection (FTIR).

FTIR utilizes light traveling in a medium internally (i.e., reflecting within the medium) due to the critical angle of reflection and the index of refraction of the material. Applications such as fiber optics use the concept of total internal reflection (TIR) to transmit light with virtually no loss. If an additional material is introduced at the surface, it may frustrate the internal reflection causing light to escape at that point of contact. Using FTIR, a multi-touch detection surface may be constructed where an object (e.g., the user's fingertip) touching the interface of a display screen that has internally reflecting light produces touch events. These touch events may be interpreted as user inputs.

In this embodiment, the FTIR implementation of system 100 is shown to comprise a plurality of infrared (IR) transmitters and receivers surrounding screen layer 102. These pulse transmitters are shown to be disposed to emit beams of light into at least one edge of display screen layer 102. Thus, display screen layer 102 functions as a light transmissive element such that when a user touches the screen, it creates an attenuation of the propagating light. Pulse receivers (such as pulse receiver 106) receive light from pulse transmitters (such as pulse transmitter 104); based on a property of the received signal (e.g., the amplitude of the signal) a position of the user touch input on screen 102 is determined.

Note that the number of pulse generators/receivers utilized by other embodiments may differ from this illustrated embodiment; for example, in some embodiments, pulse generators/receivers may completely surround the display screen layer. For example, there may be a large number of IR transmitters and receivers disposed around the peripheral of the display such that each IR transmitter sequentially transmits a pulse that is received by all the receivers. This process may continue sequentially in order to determine the touch location on the screen.

FIG. 1B further illustrates system 100 as including modulated pulse generator 114 and pulse demodulator 116. In embodiments of the disclosure, pulse generators (such as pulse generator 114) drive transmitters (such as pulse transmitter 104) to launch a burst of data modulated IR light into display screen layer 102. As described in further detail below, this data is modulated according to bit data associated with one or more peripheral components of a mobile computing device, and transmitted according to a pulse transmission trigger. This modulated IR light then propagates through the screen and is collected by one or more pulse receivers (such as pulse receiver 106). In some embodiments, one IR receiver may be designated as the master receiver that provides a connection to a controller processor involved in overall operation of the system, in addition to addressable receivers used to collect data in support of the touch functionality.

In this example, pulse demodulator 116 demodulates the received light pulse to recover the bit data modulated onto the pulse. Thus, the amplitude of the pulse is used for user touch input detection processes and the recovered bit data is used by other components of the mobile computing device (e.g., for storage or processing).

By utilizing these pulse transmitters/receivers, normally used for user touch input detection, to also exchange data via modulated light, embodiments may enable the reduction of the bezel area around the touchscreen display surface. Embodiments of the disclosure route signals through the touchscreen display layer on modulated IR light already utilized for user touch input detection, instead of routing the signals around the display on copper traces using printed circuit boards or flex circuits. Thus, embodiments may allow for slimmer screen bezels and lower costs by removing flex circuits necessary to carry data signals.

FIG. 2 is a flow diagram of a process for transmitting data via a touchscreen display of a computing device according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 200 includes operations for receiving data from or for a peripheral component of a mobile computing device, 202 (other embodiments may be utilized in a desktop computing device. Some peripheral components, such as sensors, capture data to be processed and/or stored; other peripheral components, such as audio speakers and haptic feedback components, receive data for output. Furthermore, some components such as antenna circuitry both capture and output data.

A trigger is received to transmit a photonic pulse related to a touchscreen user input detection process, 204. These processes, as described above, may be configured to periodically transmit a photonic pulse according to a predetermined frequency. This pulse is modulated according to the data received from or for said peripheral component, 206. For example, pulses may be modulated according to an encoded version of the peripheral component data. Furthermore, some embodiments may utilize wavelength division multiplexing (WDM) to transmit data from/for multiple peripheral components—i.e., a different wavelength ranges for different peripheral components.

This modulated pulse is received at a pulse detector, 208. Two separate operations are performed on the received modulated pulse—an amplitude of the pulse is determined for touchscreen user input detection processes, 210, and the pulse is demodulated to obtain the peripheral component data, 212. The above described process allows for eliminating copper traces for peripheral components to transmit/receive data from other components disposed on opposing ends of a touchscreen display, thereby potentially decreasing the dimensions of housing components of mobile computing devices.

Figure 3:
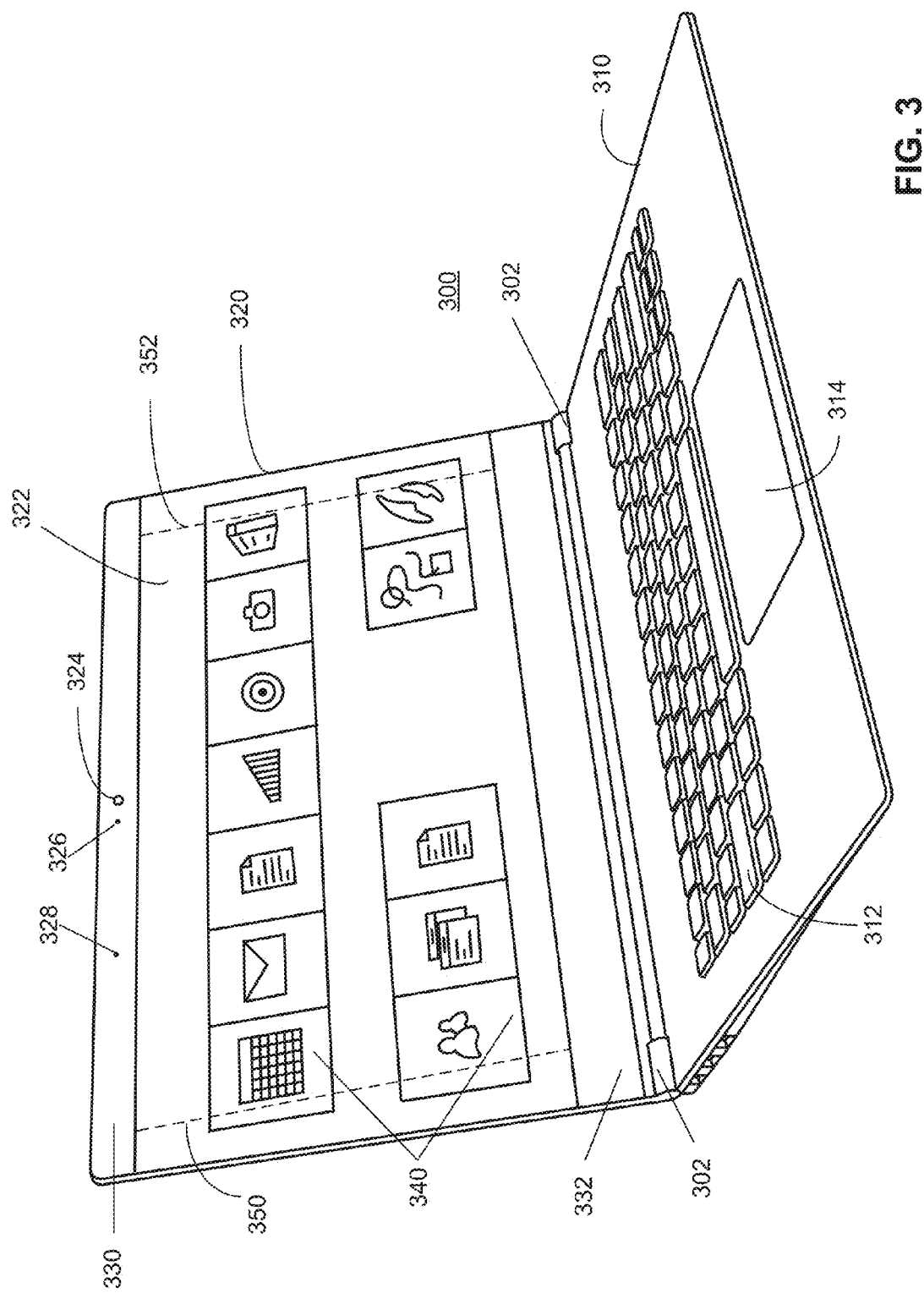
FIG. 3 is an illustration of a mobile computing device utilizing data transmission components for a touchscreen display according to an embodiment of the disclosure.

FIG. 3 is an illustration of a mobile computing device utilizing data transmission components for a touchscreen display according to an embodiment of the disclosure. Mobile computing device 300 is a laptop computer, shown to comprise a clamshell chassis having a top portion 320 and bottom portion 310 coupled together via hinge assemblies 302.

Top portion 320 of mobile computing device 300 is shown to include touchscreen display 322 placed in a housing comprising top bezel 330 and bottom bezel 332. Camera 324, microphone 326 and ambient light sensor 328 are shown to be integrated into top bezel 330. Touchscreen 322 is shown to display touch icons 340. Bottom portion 310 is shown to include keyboard 312 and mouse/trackpad 314. Other components of mobile computing device 300 not shown include processors, memory components, data buses, audio output components (i.e., audio speakers), etc. Furthermore, antenna circuitry for providing wireless connectivity for device 300 is not shown. Antenna circuitry, as referred to herein, may describe circuitry for Bluetooth® radio technology, communication protocols described in IEEE 802.11 (including any IEEE 802.11 revisions), cellular technology (such as GSM, CDMA, UMTS, EV-DO, WiMAX, or LTE), or among other possibilities. In the example described below, at least one of these components are included in bottom portion 310; however in other embodiments, top portion 320 may include these components and may further be detached from bottom portion 310 to function as a tablet computing device (similar to the form factor of device 400 of FIG. 4 discussed below).

Data from the components of top portion 320 are to be transmitted to the computing components of bottom portion 310 for storage and/or processing. For example, image data from camera 324 and audio data from microphone 326 may be stored in memory, and data captured from ambient light sensor 328 may be used when executing a process to adjust the brightness of touchscreen display 322.

As discussed above and described in further detail below, instead of routing the data around or behind the screen, embodiments of the disclosure route the data through touchscreen display 322 on modulated infrared light already utilized for user touch input detection processes. Thus, touchscreen display 322 may extend to the edges of the top portion 320, rather than utilizing side bezels to conceal wires for transmitting/receiving data. Lines 350 and 352 illustrate where the side bezels of top portion 320 would need to be in order to route signals via wires or other electrical transmission means from components 322, 324 and 326 to processor/memory components included in bottom portion 310.

Figure 4:
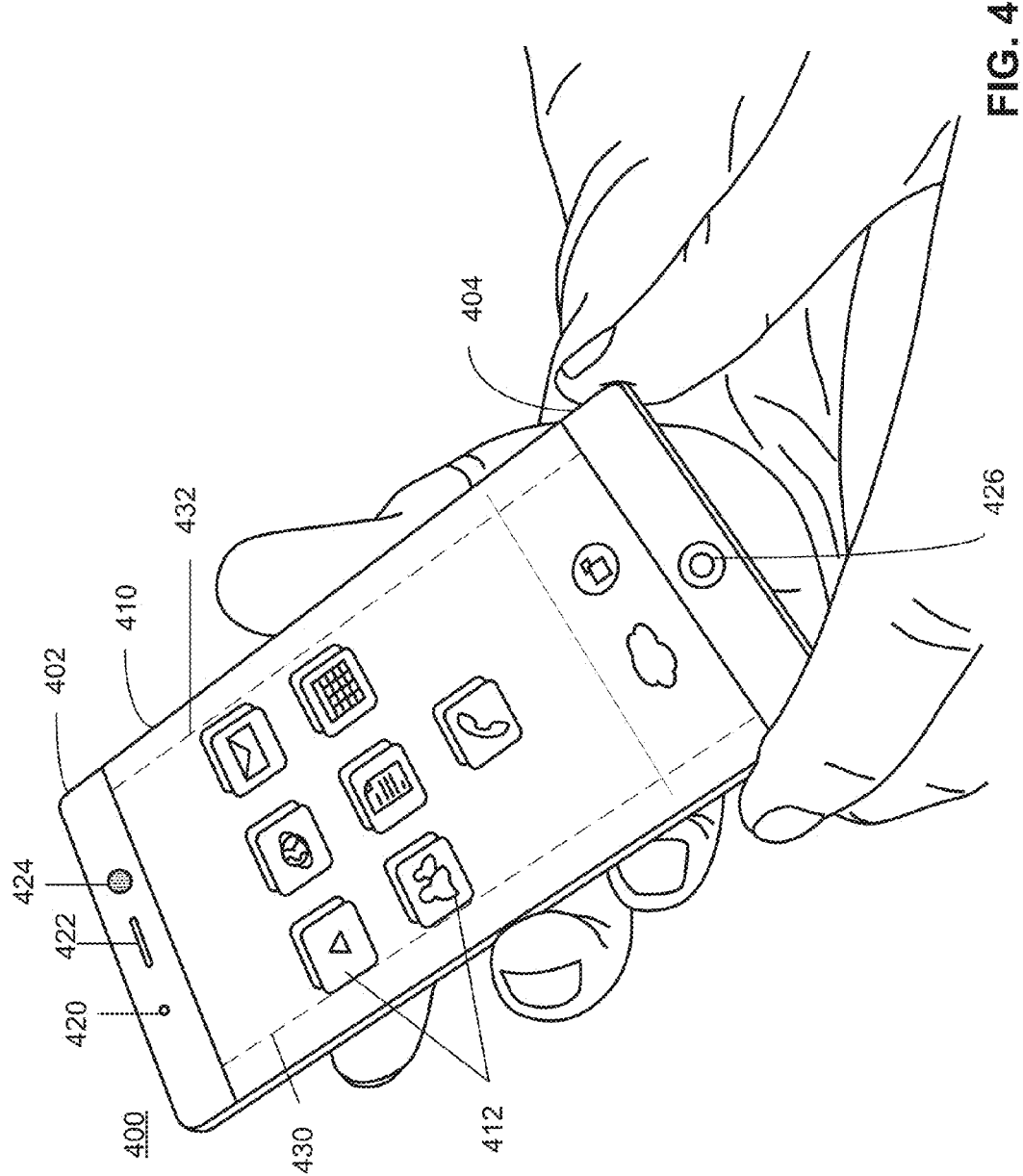
FIG. 4 is an illustration of a mobile computing device utilizing data transmission components for a touchscreen display according to an embodiment of the disclosure.

FIG. 4 is an illustration of a mobile computing device utilizing data transmission components for a touchscreen display according to an embodiment of the disclosure. Device 400 comprises a smartphone device, and includes top housing portion 402 (including ambient light sensor 420, speaker 422 and camera 424), bottom housing portion 404 (including user input button 426) and touchscreen interface 410 (displaying touch icons 412). Other components of mobile computing device 400 not shown include processor, memory components, data buses, etc., and each may be included behind touchscreen interface 410 or, alternatively, in bottom housing portion 404 in order to reduce the thickness of the device.

In this example, the data from ambient light sensor 420 and camera 424 are to be transmitted to the computing components of bottom housing portion 402 for storage and/or processing, and output audio data is transmitted from bottom housing portion 402 to speaker 422. As discussed above and described in further detail below, instead of routing the data around or behind touchscreen interface 410, embodiments of the disclosure route the data through the touchscreen on modulated infrared light already utilized for user touch input detection processes. Thus, touchscreen interface 410 may extend to the edges of device 400, rather than utilizing a bezel to conceal wires for transmitting/receiving data. Lines 430 and 432 illustrate where the side bezels of device 400 would be if data were routed to/from components of top housing portion 402 via wires or other electrical transmission means.

Figure 5A:
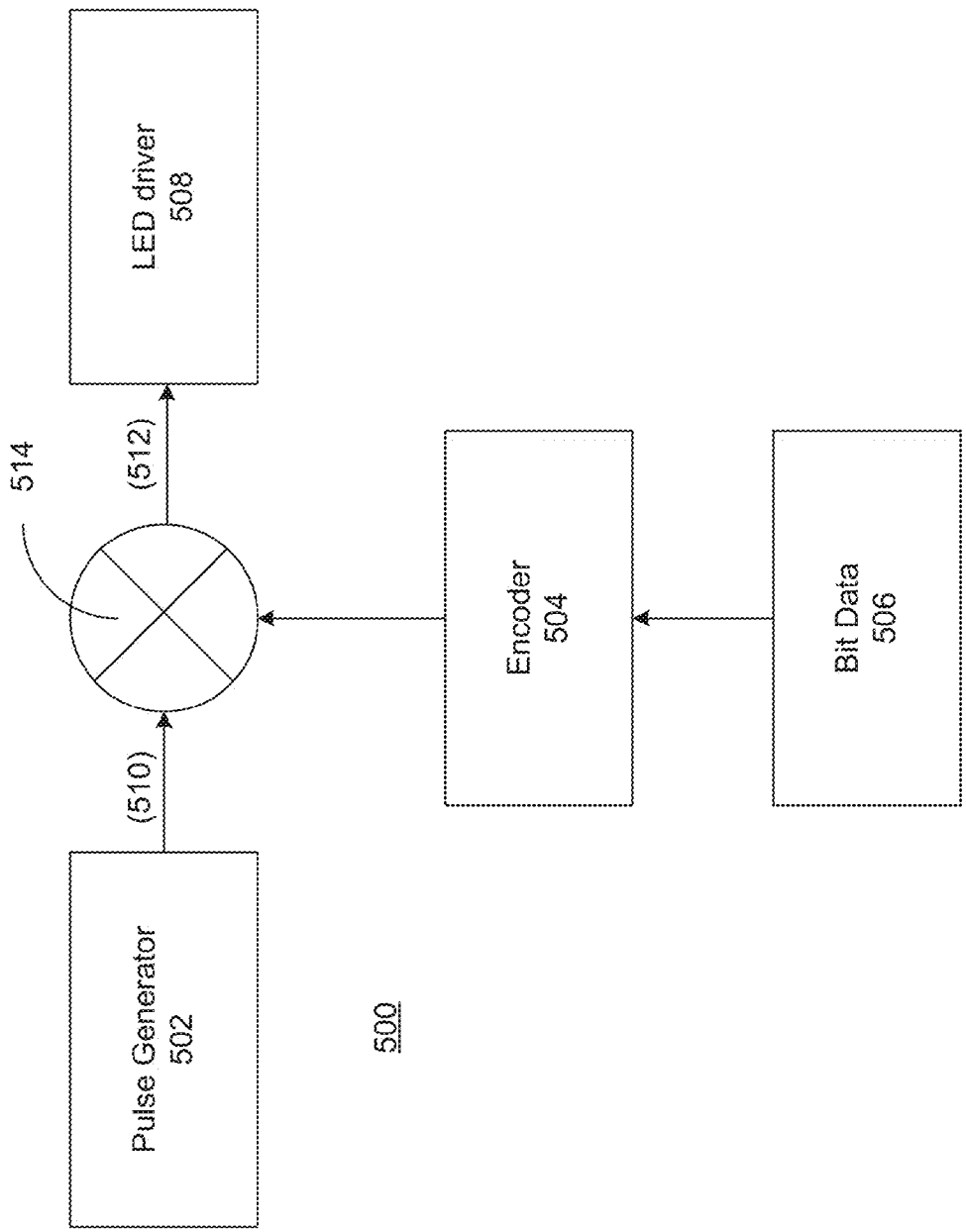
FIG. 5A is an illustration of a pulse modulating circuit according to an embodiment of the disclosure.

FIG. 5A is an illustration of a pulse modulating circuit according to an embodiment of the disclosure. In this embodiment, circuit 500 is shown to include pulse generator 502, encoder 504 for encoding bit data 506, LED driver 508, and modulator 514 shown to receive pulse 510 and generate modulated pulse 512.

Bit data 506 is related to one or more peripheral components of a computing device. This data may be buffered until a data threshold is exceeded, and a data transfer process is subsequently initiated. This process includes encoding bit data 506 via encoder 504 to generate an encoded data signal for repurposing a pulse from pulse generator 502. For example, with Manchester encoding, a bit of data is signified by a transition from a high state to a low state, or vice versa. Other encoding techniques, such as Miller encoding, may be used by other embodiments.

Figure 5B:
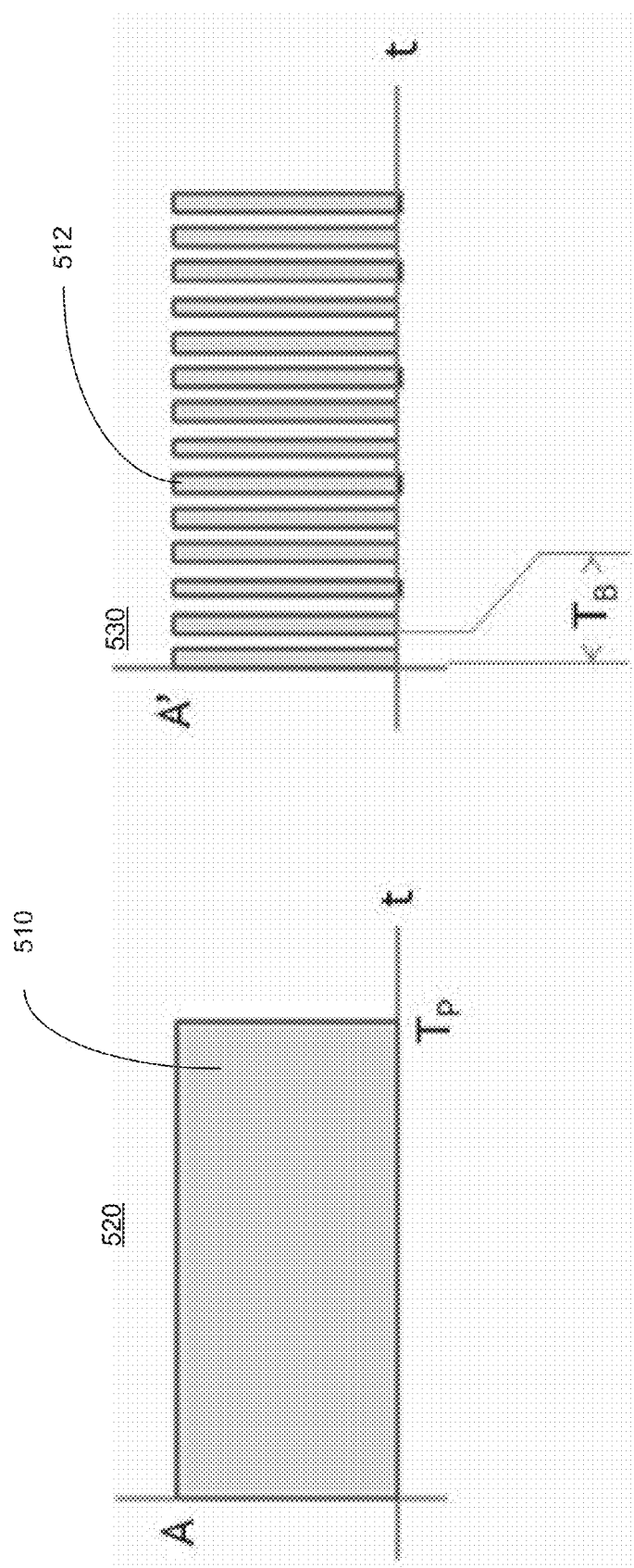
FIG. 5B is an illustration of a modulated pulse according to an embodiment of the disclosure.

Modulator 514 modulates carrier signal 510 generated by pulse generator 502 according to the encoded signal produced by encoder 504. FIG. 5B is an illustration of a modulated pulse according to an embodiment of the disclosure. Graph 520 of FIG. 5B illustrates pulse 510, and graph 530 illustrates modulated pulse 512, wherein the amplitude and period of pulse 512 is unchanged, but the pulse is now modulated to include (encoded) bit data 506. In these graphs, $T_P$ is the time duration of pulse 210, and $T_B$ is the bit time duration for modulated pulse 512.

Figure 6:
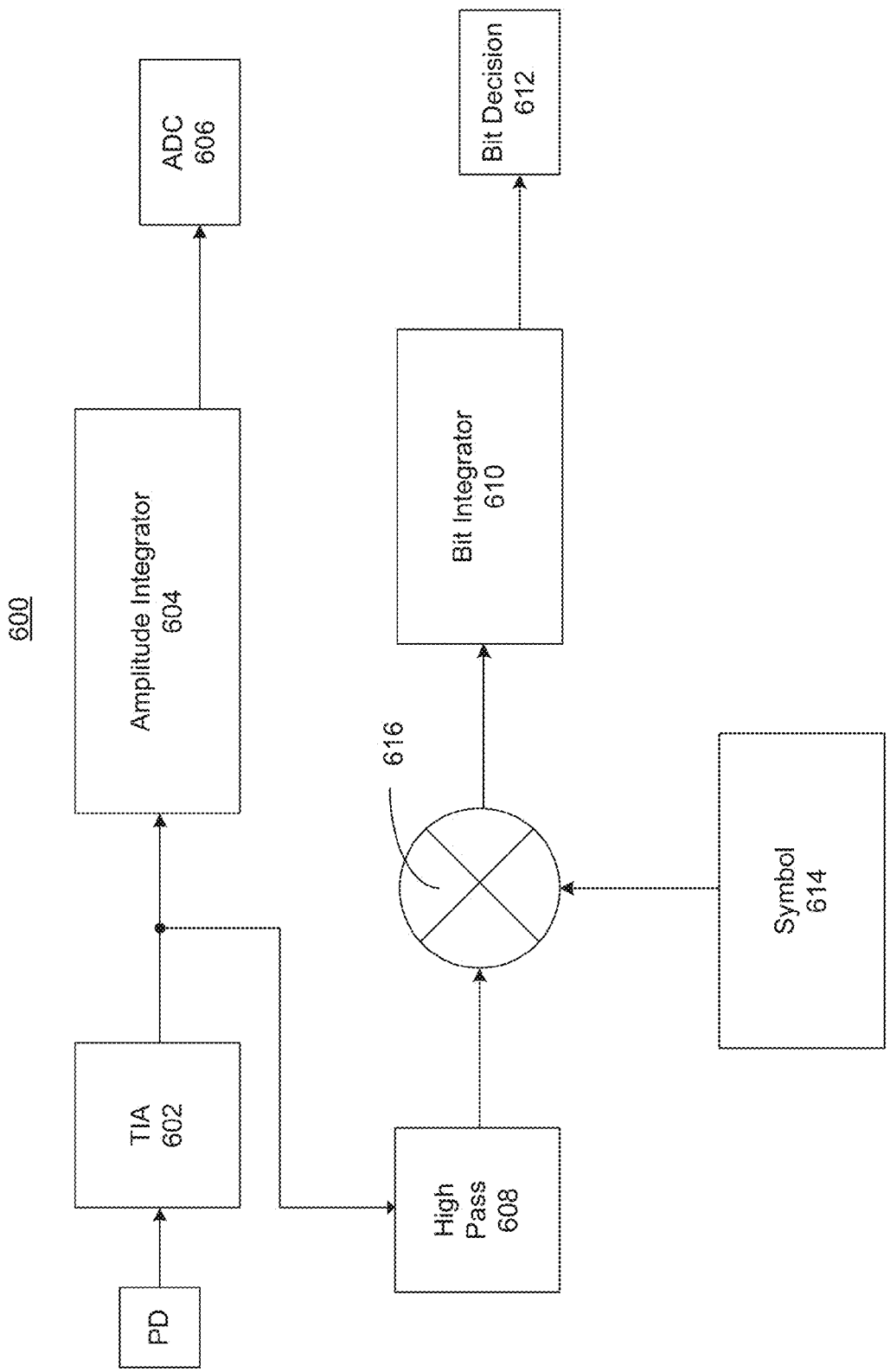
FIG. 6 is an illustration of pulse demodulating circuit according to an embodiment of the disclosure.

FIG. 6 is an illustration of pulse demodulating circuit according to an embodiment of the disclosure. Circuit 600 is shown to include trans-impedance amplifier (TIA) 602, amplitude integrator 604, analog-to-digital converter (ADC) 606, high pass filter 608, bit integrator 610, bit decision logic 612, decoding symbol 614 and modulator 616.

In this example, light is received from a photodiode and TIA 602 (i.e., a current to voltage converter) to obtain the transmitted modulated pulse (i.e., pulse 512 of FIG. 5B). At this stage, the pulse is split into two different components. Amplitude integrator 604 is configured to integrate the pulse based on $T_P$; thus the modulation is essentially stripped from the pulse so that the signal received by ADC 606 more closely resembles the non-modulated pulse (i.e., pulse 502 of FIG. 5B); the digital output of ADC 606 may be used for user touch input detection processes.

High pass filter 608 receives the transmitted modulated pulse to obtain the high frequency modulation of the signal. Decoder 616 decodes the signal based on the boundaries defined by decoding symbol 614. Bit integrator 610 integrates the transitions of the modulator based on time period $T_B$ of FIG. 5B, and bit decision logic 612 decodes whether the transitions represents a zero or a one (e.g., for Manchester encoding, a zero is expressed by a low-to-high transition, and a one by high-to-low transition).

Figure 7:
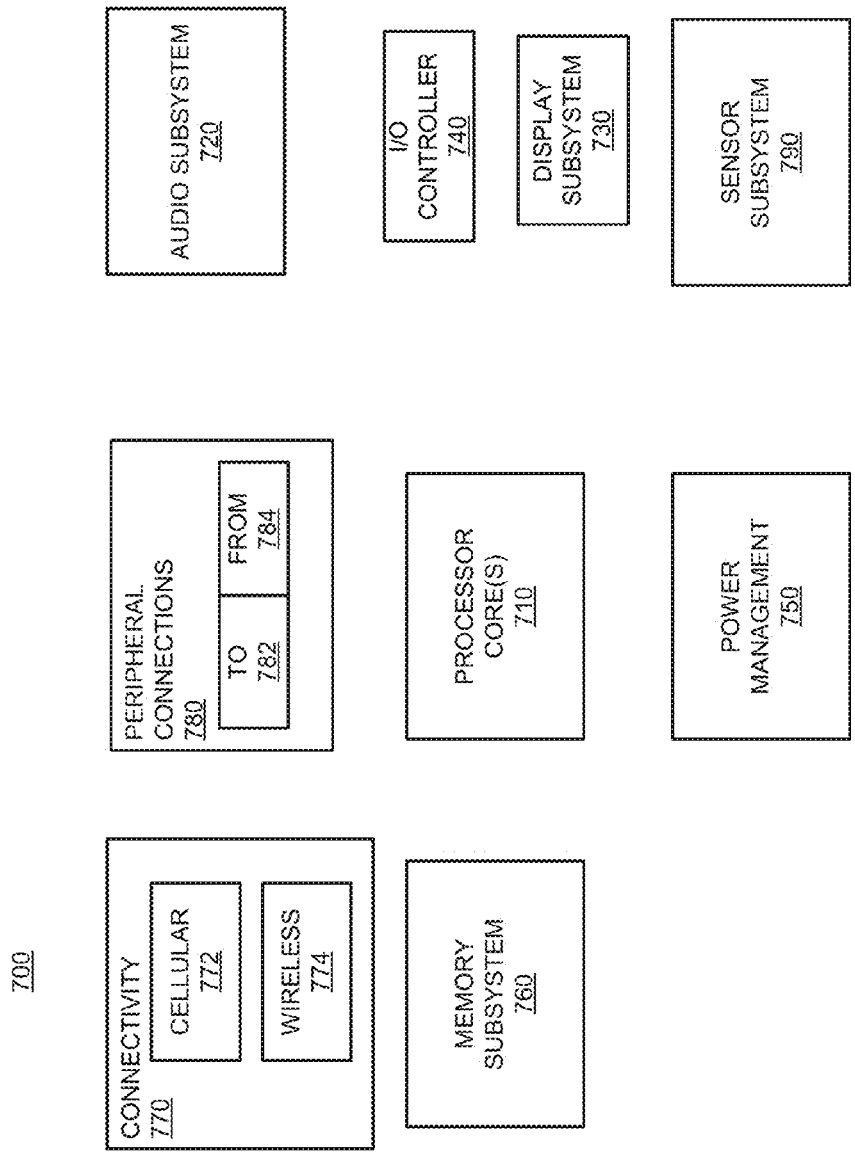
FIG. 7 is a block diagram of computing components of a computing device according to an embodiment of the disclosure.

FIG. 7 is a block diagram of computing components of a computing device according to an embodiment of the disclosure. It will be understood that certain of the components are shown generally, and not all components of such a device are shown in device 700. Furthermore, it will be understood that any of the illustrated components may be discrete components or may be components included on a system on a chip (SoC) integrated circuit (IC), and may be communicatively coupled through any direct or indirect means.

Device 700 may comprise any of the computing devices (mobile or otherwise) utilizing the data transmission and touchscreen user input detection processes discussed above. Device 700 includes one or more processor cores 710, which performs the primary processing operations of device 700. Each of processor core(s) 710 can be SoC components, or can be included in one or more physical devices, such as single or multi-core microprocessors, application processors, microcontrollers, programmable logic devices, or other processing means. The processing operations performed by processor core(s) 710 include the execution of an operating platform or operating system on which applications and/or device functions are executed. The processing operations include operations related to I/O (input/output) with a human user or with other devices, operations related to power management, and/or operations related to connecting device 700 to another device. The processing operations may also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 700, or connected to device 700. In one embodiment, a user interacts with device 700 by providing audio commands that are received and processed by processor core(s) 710.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. Display subsystem 730 includes a touchscreen, and thus the display device also acts as an input device, which can be at least partially managed by I/O controller 740. There can also be additional buttons or switches on device 700 to provide I/O functions managed by I/O controller 740. I/O controller may further include, or interface with, logic for transmitting data utilizing the touchscreen user input detection processes as discussed above.

In one embodiment, I/O controller 740 manages devices such as accelerometers, cameras, light sensors or other environmental sensors, or other hardware that can be included in device 700. The input can be part of direct user interaction, as well as providing environmental input to the system to influence its operations (such as filtering for noise, adjusting displays for brightness detection, applying a flash for a camera, or other features). In one embodiment, device 700 includes power management 750 that manages battery power usage, charging of the battery, and features related to power saving operation.

Memory subsystem 760 includes memory devices for storing information in device 700. Memory can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700. Memory 760 further stores firmware images related to boot path operations, and thus may include DRAM devices to store said firmware images as described above.

Connectivity 770 includes hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 774 refers to wireless connectivity that is not cellular, and can include personal area networks (such as Bluetooth), local area networks (such as Wi-Fi), and/or wide area networks (such as Wi-Max), or other wireless communication.

Peripheral connections 780 include hardware interfaces and connectors for implementing non-flash firmware storage support as described above, as well as software components (e.g., drivers, protocol stacks) to make peripheral connections. It will be understood that device 700 could both be a peripheral device ("to" 782) to other computing devices, as well as have peripheral devices ("from" 784) connected to it.

Device 700 may have a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audio-visual or other systems. In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Various components referred to above as processes, servers, or tools described herein may be a means for performing the functions described. Each component described herein includes software or hardware, or a combination of these. Each and all components may be implemented as logic such as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

Embodiments of the disclosure describe a mobile computing device comprising a touchscreen display surface included in a housing, a peripheral component integrated into the housing of the touchscreen display surface, a plurality of photonic pulse transmitters disposed on at least one edge of the touchscreen display surface, one or more pulse detectors disposed on at least one edge of the touchscreen display surface, and arranged to receive pulses from the plurality of photonic pulse transmitters for detecting user touch inputs on the touchscreen display surface, a photonic pulse modulator to modulate a pulse to be transmitted from one of the plurality of photonic pulse transmitters based, at least in part, on peripheral component data, and a photonic pulse demodulator to demodulate the modulated pulse received by the pulse detector(s) to retrieve the peripheral component data from the modulated pulse.

In some embodiments, the peripheral component data comprises data to be transmitted from the peripheral component. In some of these embodiments, the peripheral component comprises at least one of an image sensor, an audio sensor, an ambient light sensor, or antenna circuitry.

In some embodiments, the peripheral component data comprises data to be transmitted to the peripheral component. In some of these embodiments, the peripheral component comprises at least one of antenna circuitry, an audio output component, or a haptic feedback component.

In some embodiments, the pulse transmitted from one of the plurality of photonic pulse transmitters is modulated according to at least one of a Miller encoding scheme or a Manchester encoding scheme. In some embodiments, the plurality of photonic pulse transmitters are to transmit pulses to a single pulse emitter according to a time division multiple access (TDMA) protocol.

In some embodiments, the mobile computing device further comprises a second peripheral component, wherein the photonic pulse modulator is to modulate a pulse transmitted from one of the plurality of photonic pulse transmitters further based, at least in part, on data related to the second peripheral component according to wavelength division multiplexing (WDM) protocol.

In some embodiments, the mobile computing device comprises a handheld mobile computing device. In other embodiments, the mobile computing device comprises a laptop computer and further comprises a clamshell chassis including a second housing coupled to the housing of the touchscreen display surface, wherein the peripheral component data comprises data exchanged with a processor included in the second housing.

Embodiments of the disclosure described a non-transitory computer readable storage medium including instructions that, when executed, cause a computer to perform a method comprising receiving data related to a peripheral component of a mobile computing device, transmitting a photonic pulse from a photonic pulse transmitter disposed on a side of a touchscreen display surface of the mobile computing device to a photonic pulse detector disposed on another side of the touchscreen display surface, wherein the photonic pulse is modulated based, at least in part, on the peripheral component data, determining whether a user touch input occurred on the touchscreen display surface based, at least in part, on an amplitude value of the modulated photonic pulse, and demodulating the modulated photonic pulse to retrieve the peripheral component data.

In some embodiments, the peripheral component data comprises data to be transmitted from the peripheral component. In some of these embodiments, the peripheral component comprises at least one of an image sensor, an audio sensor, an ambient light sensor, or antenna circuitry.

In some embodiments, the peripheral component data comprises data to be transmitted to the peripheral component. In some of these embodiments, the peripheral component comprises at least one of antenna circuitry, an audio output component, or a haptic feedback component.

In some embodiments, the photonic pulse is modulated according to at least one of a Miller encoding scheme or a Manchester encoding scheme. In some embodiments, the mobile computing device comprises a plurality of photonic pulse transmitters to transmit pulses to a single pulse emitter according to a time division multiple access (TDMA) protocol.

In some embodiments, the mobile computing device further comprises a second peripheral component; wherein the photonic pulse is modulated further based, at least in part, on data from the second peripheral component according to wavelength division multiplexing (WDM) protocol.

The invention claimed is:

1. A mobile computing device comprising:
   a touchscreen display surface included in a housing;
   a peripheral component integrated into the housing of the touchscreen display surface;
   a plurality of photonic pulse transmitters disposed on at least one edge of the touchscreen display surface;
   one or more pulse detectors disposed on at least one edge of the touchscreen display surface, and arranged to receive pulses from the plurality of photonic pulse transmitters for detecting user touch inputs on the touchscreen display surface;
   a photonic pulse modulator to modulate a pulse to be transmitted from one of the plurality of photonic pulse transmitters used in detecting user touch inputs of the touchscreen display surface, wherein the photonic pulse is modulated prior to transmission from the photonic pulse transmitter based, at least in part, on the peripheral component data; and
   a photonic pulse demodulator to demodulate the modulated pulse received by the pulse detector(s) to retrieve the peripheral component data from the modulated pulse.

2. The mobile computing device of claim 1, wherein the pulse transmitted from one of the plurality of photonic pulse transmitters is modulated according to at least one of a Miller encoding scheme or a Manchester encoding scheme.

3. The mobile computing device of claim 1, wherein the plurality of photonic pulse transmitters are to transmit pulses to a single pulse emitter according to a time division multiple access (TDMA) protocol.

4. The mobile computing device of claim 1, further comprising:
   a second peripheral component; wherein the photonic pulse modulator to modulate a pulse transmitted from one of the plurality of photonic pulse transmitters further based, at least in part, on data related to the second peripheral component according to wavelength division multiplexing (WDM) protocol.

5. The mobile computing device of claim 1, wherein the mobile computing device comprises a handheld mobile computing device.

6. The mobile computing device of claim 1, wherein the mobile computing device comprises a laptop computer and further comprises:
   a clamshell chassis including a second housing coupled to the housing of the touchscreen display surface; wherein the peripheral component data comprises data exchanged with a processor included in the second housing.

7. The mobile computing device of claim 1, wherein the peripheral component data comprises data to be transmitted from the peripheral component.

8. The mobile computing device of claim 7, wherein the peripheral component comprises at least one of an image sensor, an audio sensor, an ambient light sensor, or antenna circuitry.

9. The mobile computing device of claim 1, wherein the peripheral component data comprises data to be transmitted to the peripheral component.

10. The mobile computing device of claim 9, wherein the peripheral component comprises at least one of antenna circuitry, an audio output component, or a haptic feedback component.

11. A non-transitory computer readable storage medium including instructions that, when executed, cause a computer to perform a method comprising:
    receiving data related to a peripheral component of a mobile computing device;
    transmitting a photonic pulse from a photonic pulse transmitter disposed on a side of a touchscreen display surface of the mobile computing device to a photonic pulse detector disposed on another side of the touchscreen display surface for use in detecting user touch inputs of the touchscreen display surface, wherein the photonic pulse is modulated prior to transmission from the photonic pulse transmitter based, at least in part, on the peripheral component data;

determining whether a user touch input occurred on the touchscreen display surface based, at least in part, on an amplitude value of the modulated photonic pulse; and demodulating the modulated photonic pulse to retrieve the peripheral component data.

12. The transitory computer readable storage medium of claim 11, wherein the photonic pulse is modulated according to at least one of a Miller encoding scheme or a Manchester encoding scheme.

13. The transitory computer readable storage medium of claim 11, wherein the mobile computing device comprises a plurality of photonic pulse transmitters to transmit pulses to a single pulse emitter according to a time division multiple access (TDMA) protocol.

14. The transitory computer readable storage medium of claim 11, wherein the mobile computing device further comprises:

a second peripheral component; wherein the photonic pulse is modulated further based, at least in part, on data from the second peripheral component according to wavelength division multiplexing (WDM) protocol.

15. The transitory computer readable storage medium of claim 11, wherein the peripheral component data comprises data to be transmitted from the peripheral component.

16. The transitory computer readable storage medium of claim 15, wherein the peripheral component comprises at least one of an image sensor, an audio sensor, an ambient light sensor, or antenna circuitry.

17. The transitory computer readable storage medium of claim 11, wherein the peripheral component data comprises data to be transmitted to the peripheral component.

18. The transitory computer readable storage medium of claim 17, wherein the peripheral component comprises at least one of antenna circuitry, an audio output component, or a haptic feedback component.

19. A method comprising:

receiving data related to a peripheral component of a mobile computing device;

transmitting a photonic pulse from a photonic pulse transmitter disposed on a side of a touchscreen display surface of the mobile computing device to a photonic pulse detector disposed on another side of the touchscreen display surface for use in detecting user touch inputs of the touchscreen display surface, wherein the photonic pulse is modulated prior to transmission from the photonic pulse transmitter based, at least in part, on the peripheral component data;

determining whether a user touch input occurred on the touchscreen display surface based, at least in part, on an amplitude value of the modulated photonic pulse; and demodulating the modulated photonic pulse to retrieve the peripheral component data.

20. The method of claim 19, wherein the mobile computing device further comprises a second peripheral component, and the method further comprises:

modulating the photonic pulse further based, at least in part, on data from the second peripheral component according to wavelength division multiplexing (WDM) protocol.

* * * * *